United States Patent [19]

Osborn

[11] 3,712,114

[45] Jan. 23, 1973

[54] DUST BAG QUALITY TESTING SYSTEM

[76] Inventor: Jack S. Osborn, 4041 South Richmond, Tulsa, Okla. 74135

[22] Filed: May 3, 1971

[21] Appl. No.: 139,723

[52] U.S. Cl. .........................73/38, 55/270, 55/274, 55/361, 55/367, 55/418, 73/40.5 R
[51] Int. Cl. ....G01m 3/28, G01n 15/08, B01d 35/14
[58] Field of Search .............73/40, 40.5 R, 45.8, 38; 138/97; 55/341, 361, 367, 97, 270, 274, 418

[56] References Cited

UNITED STATES PATENTS

| | | | |
|---|---|---|---|
| 2,167,236 | 7/1939 | Gieseler | 55/361 X |
| 3,325,979 | 6/1967 | Smith | 55/341 X |
| 2,157,135 | 5/1939 | Little et al. | 73/38 |
| 2,460,655 | 2/1949 | Rickmeyer | 73/38 |

Primary Examiner—Louis R. Prince
Attorney—Head & Johnson

[57] ABSTRACT

This invention is concerned with the testing, while in use, of the plurality of filtering elements in an air filtration system. The system involves an air inlet chamber separated from an air outlet chamber by a tube sheet. Filtration elements are clamped over these tubes so that air passes up the tubes into the elements, or bags, through the walls of the elements and into the outlet air chamber; the dust remaining inside the bags. To test the condition of each bag separately, a probe tube is selectively positioned through the wall of the air inlet chamber beneath any desired tube and filter element. The annular space between tip and tube is sealed off by means of an inflatable collar. Low pressure air is injected into the isolated element at a constant rate. The pressure of the air within the element is measured and is indicative of the condition of the element. Conversely the pressure within the element may be constant and the flow rate measured as an indicator of the filter condition. If an element has an opening through the wall, air through that element must be closed off. This is done by positioning in the tube a bladder, inflating it with pressurized air through a needle passing through the wall of the bladder, and withdrawing the needle.

15 Claims, 7 Drawing Figures

INVENTOR.
JACK S. OSBORN
BY Head & Johnson
ATTORNEYS

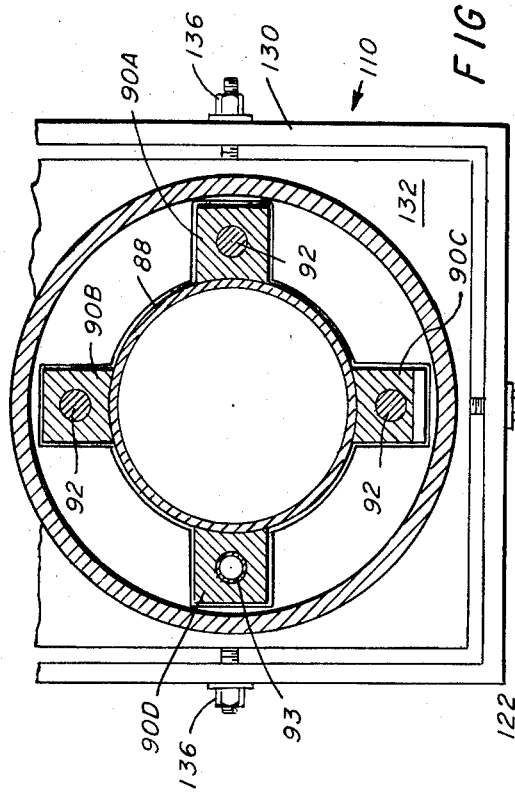
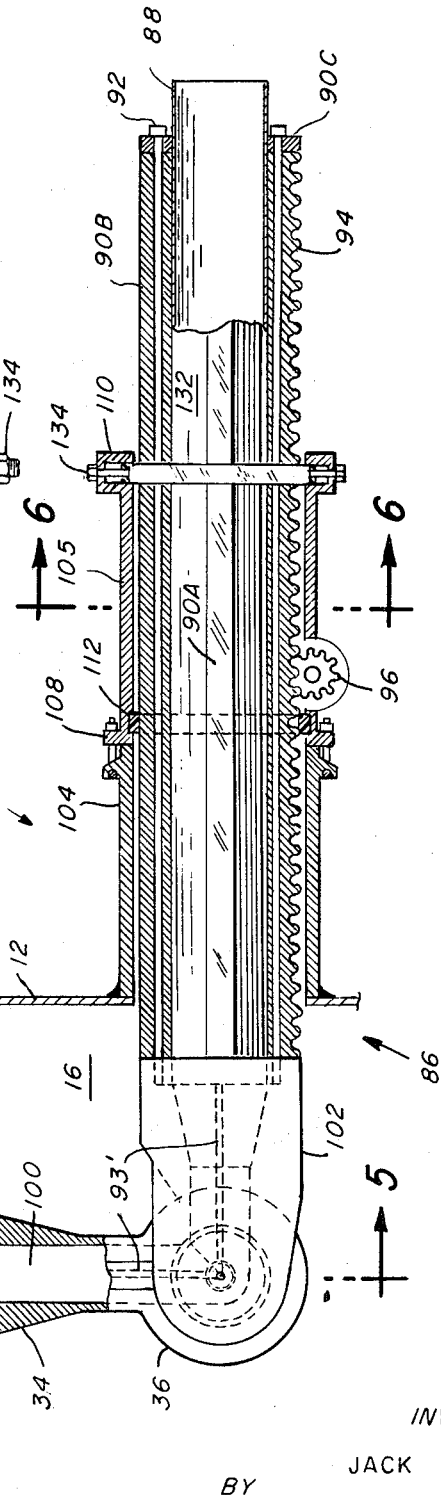
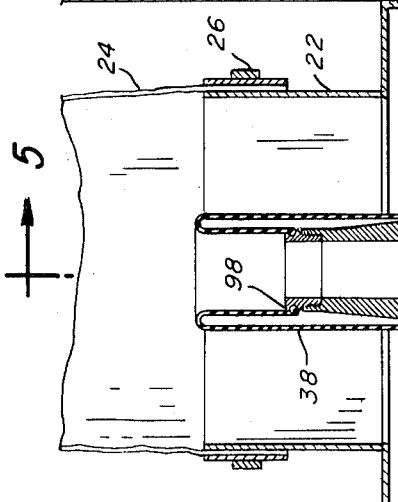

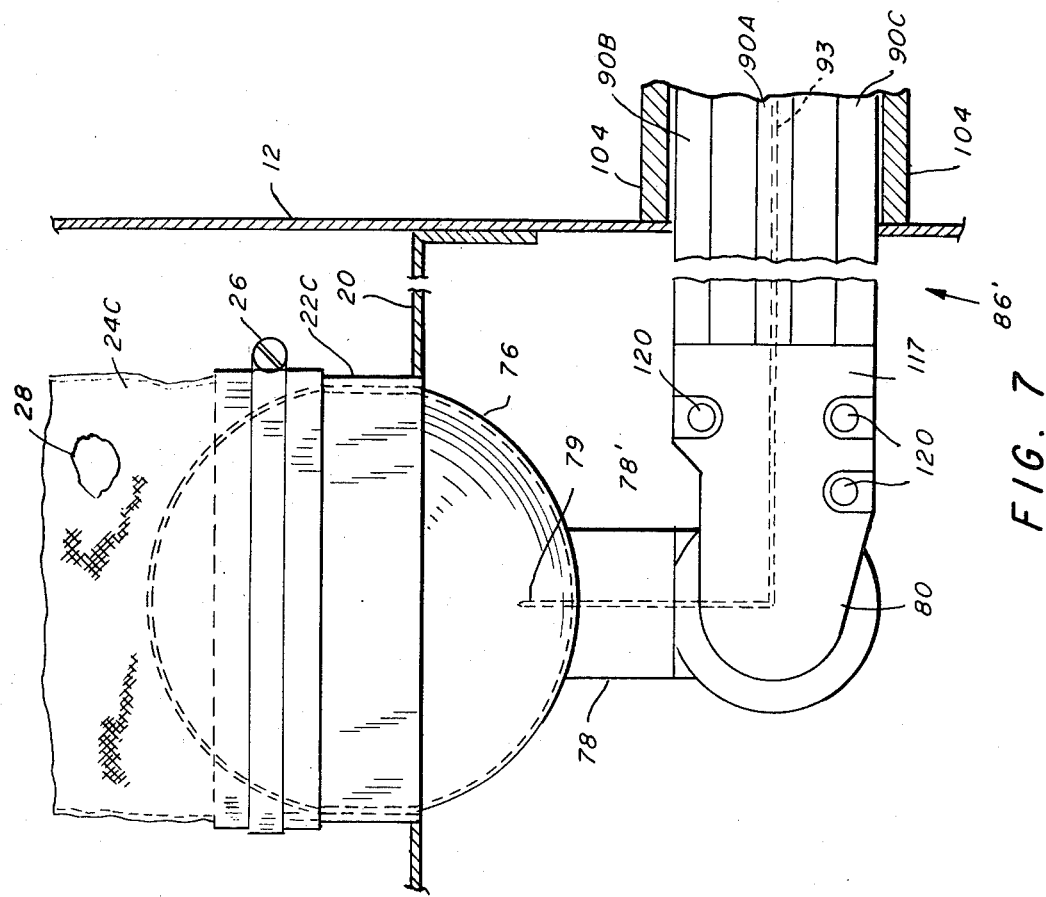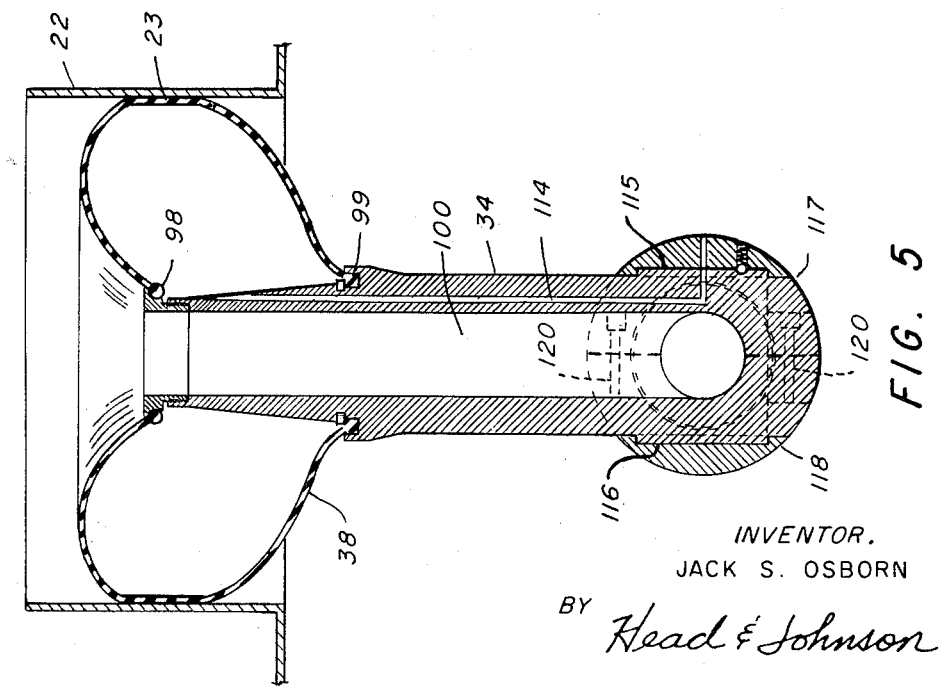

3,712,114

DUST BAG QUALITY TESTING SYSTEM

BACKGROUND OF THE INVENTION

1. Field of the Invention

This invention is concerned with devices for filtering dust from dust-laden air. More specifically it is concerned with devices which operate a plurality of dust collecting elements, such as porous bags, which are connected in parallel through a tube sheet and receive dust-laden air from an air inlet chamber, and pass the air through their porous walls into an outlet air chamber, while retaining the dust on the inner surface of the bags. Still more particularly, this invention is concerned with means for sequentially testing each of the plurality of bags for its permeability, that is, its effectiveness as a dust removing element, and for temporarily closing off a bag found to be faulty.

2. Description of the Prior Art

In the prior art there has not been a satisfactory way of selectively testing each of the plurality of bags, and closing off the air flow through any bag found to be faulty. This meant that the entire bag house had to be shut down periodically so that visual inspection could be made of each bag, and the faulty ones replaced. This procedure was unsatisfactory since it either took the entire system out of service, or it required complex construction and valving, etc. to selectively shut down only parts of the system. Also, visual inspection of the outer surface of the bags, while satisfactory for detection of large tears or openings, would not precisely indicate the nature of the dust covering, such as caking, on the inside surface of the bags or worn spots caused by abrasive action.

SUMMARY OF THE INVENTION

This invention is designed to provide (a) a means to selectively test the condition of each bag from outside the system without shutting down the system, and (b) to selectively shut off the flow through a selected bag.

It is therefore the objects of this invention to accomplish these two purposes.

This object is accomplished by sealably inserting a probe tube through the wall of the inlet air chamber, in line with the row of bag tubes through the tube sheet that separates the inlet air from the outlet air. The end of the probe tube is sealed into a selected one of the bag tubes, thus closing off the flow of dust-laden air from the inlet air chamber through the bag, but permitting the flow of measurement gas through the probe and into the bag. Such measurement gas is flowed at a selected constant rate or pressure through the probe, into and through the bag. The respective pressure or flow rate is measured. If the flow pressure is low it means that the permeability of the bag is too high, indicating a probable rupture in the bag. On the other hand if the pressure is too high it means that the bag is ineffective in passing air.

If the bag is found to be ruptured, this invention further provides a means to close off the bag tube leading to the faulty bag. This is done by placing a deflated, inflatable bladder on the end of the probe, with a needle piercing the bladder, inserting the bladder into the selected tube, inflating the bladder tightly inside the tube, withdrawing the needle (the bladder seals the needle hole) and withdrawing the probe.

These and other objects and the principles of this invention will be better understood from the following description taken in connection with the appended drawings, in which:

BRIEF DESCRIPTION OF THE DRAWINGS

FIGS. 4 and 5 illustrate details of the probe tube, swivel and inflatable collar of the embodiment of FIG. 1.

FIG. 6 is a sectional view along 6—6 of FIG. 4.

FIG. 7 illustrates the detail of the embodiment of FIG. 3.

DESCRIPTION OF THE PREFERRED EMBODIMENTS

Figure 1:
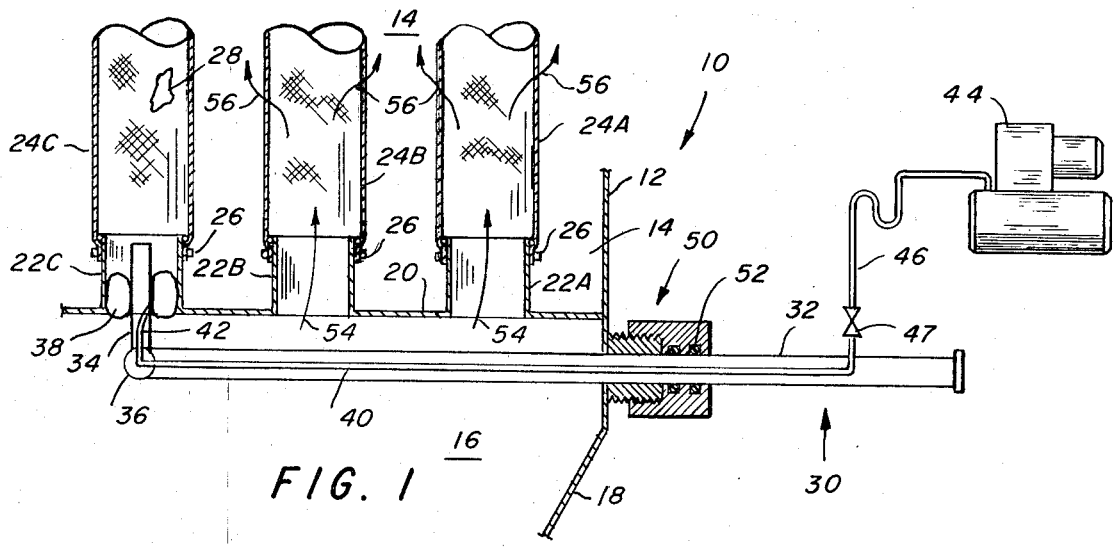
FIG. 1 is a schematic view in section of one embodiment of this invention.

Referring to the drawings, and in particular to FIG. 1, I show one embodiment of this invention. Numeral 10 represents the bag house, with external wall 12 and with tube sheet 20 dividing the inlet air space 16 from the outlet air space 14. The tube sheet 20 has sealed through it a plurality of short bag tubes 22A, 22B, 22C, etc. to which dust collecting elements or bags 24A, 24B, 24C, etc. are fastened by means of clamps 26. The bags are closed at their upper end and are of pervious material, so that the incoming dust-laden air flows upward 54 through the tubes 22 into the bags 24 and through the walls of the bags 56 into the outlet air space 14. The dust collectors on the inside surfaces of the bags. At selected intervals the bags are jarred or shaken to free the dust from the surface. The dust falls downward through the tubes into the hopper 18 from which it is removed.

Occasionally a bag will become worn, closed, or impervious due to caking or dust on the inside. When this happens the bag is ineffective in its operation. Also, it is possible for the bag to rip or tear, leaving an opening 28 through which the dust-laden air can flow to the outlet. This contaminates the rest of the filtered air. When any of these conditions arise it is important to know about it so that steps can be taken to correct the condition.

In this invention means are provided to test each of the bags to determine its condition. Preferably the procedure involves closing off the tube 22 to inlet air while passing a measured flow of air through the tube, 22 into the bag, and through the bag wall, while measuring the pressure in the air being supplied. For a constant flow, if the pressure is too high it will indicate that the bag is impervious. If the pressure is too low it will indicate that the bag is too pervious, that is, it has an opening or tear.

The invention involves a probe assembly having an outer tube 32 inserted through the wall of the inlet air chamber 18, through a probe support 50 which may include seal means 52. The probe tube 32 has at its leading end a swivel 36 and a short tip section 34. The purpose of the swivel is to permit the tip section 34 to be axially aligned with tube 32 to insert the assembly through the probe support 50, and later have the section 34 turned at right angles so that it can be inserted into the tube, such as 22C. The tip 34 has an inflatable collar 38 surrounding it so that after it is inserted into the tube 22C and the collar is inflated, no air from chamber 16 can flow through the tube 22C. Only air flowing through probe tube 32 can get into the bag 24C.

Figure 2:
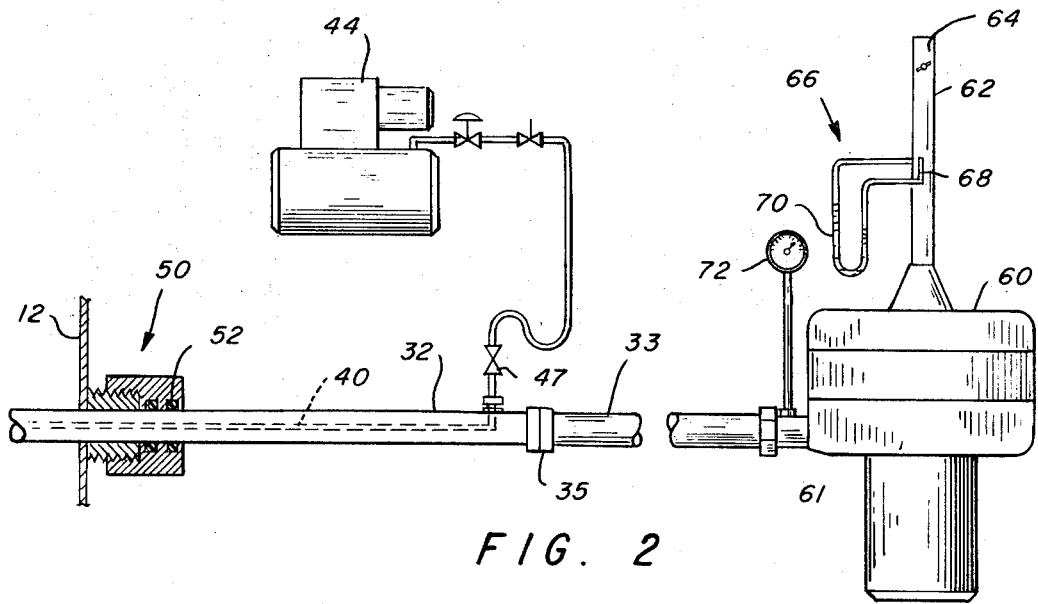
FIG. 2 illustrates how the embodiment of FIG. 1 is used to test the condition of the filter elements.

Inside the probe tube 32 is a small tube 40 which, at 42, is attached to the inflatable collar. This pipe 40 is fed from an air compressor 44 through pipe 46 and valve 47. Thus, once the probe tip 34 is inserted and sealed into tube 22C, the test of the bag 24C is ready to be carried out. This is shown in FIG. 2. Here a low pressure air blower 60 has its outlet 61 connected to pipe 33, which connects to probe tube 32 by coupling 35. The air inlet pipe 62 to the blower has a flow control valve 64, and a flow rate measuring means 66 including Pitot tube 68 and manometer 70. The outlet pipe 61 has a pressure gauge 72.

In operation, when the probe tip 34 is sealed into the tube 22C, the collar inflating valve 47 is closed. Then the blower 60 is started and the flow adjusted to a preselected value as shown by 66. Then the pressure is read on gauge 72. This reading (as explained above) will tell the condition of the bag 24C.

If the pressure is too high, it will indicate that the bag is impervious. In this case the bag can be shaken or rapped to see if its condition improves. If not, nothing can be done without shutting down the unit. However, note is made so that the next time the unit is shut down the bag will be replaced.

If the pressure is too low it will indicate that there is a tear or opening in the bag 24C and the tube 22C must be closed off. How this is done is illustrated in FIG. 3.

A probe assembly 31' with outer tube 32' and inner tube 40', has a different tip 78 beyond the swivel 80. This tip 78 carries a small diameter needle 79 connected to the inner pipe 40'. Means are provided in tip 78 for holding an uninflated spherical bladder such as might be used in basketballs, etc. The needle 79 is pressed through the bladder wall, the bladder 76 placed in position on the tip 78. The tip, with bladder, is inserted through seal 50 and into tube 22C. Then compressed air is supplied by pipe 46, through valve 47, through pipe 40' and needle 79 into bladder 76. The bladder is inflated until it is strongly wedged inside the tube 22C. The valve 47 is closed and the needle withdrawn from the bladder. The material of the bladder is such that the needle hole remains sealed. Thus the bladder will stay in position for an indefinite period, closing off air flow into bag 24C.

Later when the unit is shut down to make repairs and change bags, etc., the bladder 76 can be recovered.

Figure 3:
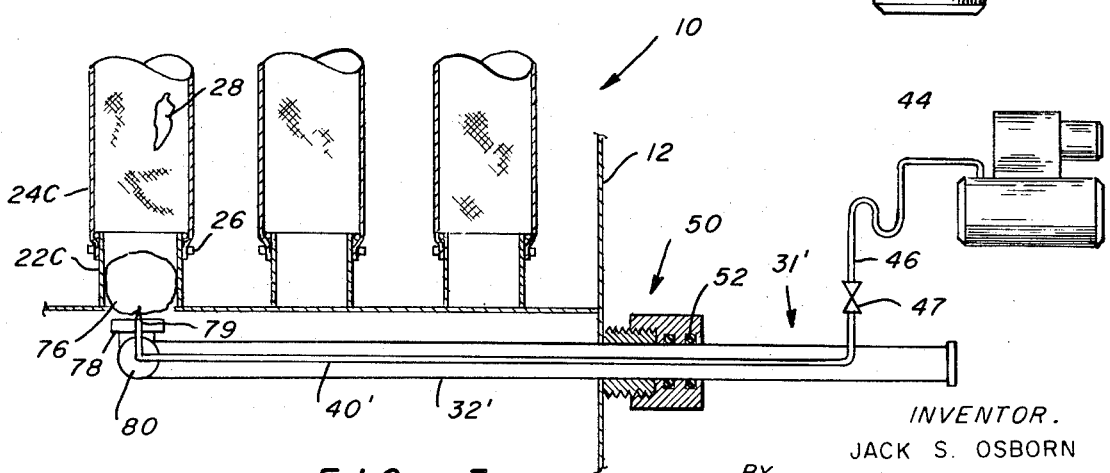
FIG. 3 illustrates schematically another embodiment of this invention.

In FIGS. 1, 2 and 3 I have shown in schematic fashion how my invention works. In FIGS. 4, 5, 6 and 7 I show a little more detail of the apparatus. FIG. 4 shows in vertical section the detail of the probe 86, swivel 36 and inflatable collar 38. The probe is made of a thin-walled tube 88 which is stiffened with longitudinal ribs 90. These can be made in sections which are held together by longitudinal long bolts 92. Four of these ribs are used of which one, 90C, has a gear rack 94 cut into its edge. This, in combination with pinion 96, serves to feed the probe in or out, so as to position the hinged tip 34 in the center of each of the several tubes 22.

Also the rib 90D (FIG. 6) has a tube 93 instead of a bolt. This tube 93 serves to carry the high pressure air to inflate the collar 38. This air goes by way of tube 93 and 93', past the swivel and by drilled hole 114 (FIG. 5) in tip 34. FIG. 5 shows a view of the probe assembly along plane 5—5 of FIG. 4 and shows the collar 38 in inflated condition, sealed tightly 28 against the inside surface of the tube 22. The tube 88 is inset into a swivel structure 102 which is made in two halves 117, 118 held together by screws 120. These halves are machined to provide seats for the two faces 115, 116 of the tip 34. Thus, the tip 34 can be rotated in the swivel to be colinear with the tube 88, or at right angles as shown in FIG. 4. A coiled wire spring (not shown, but well known in the art) is inserted into the swivel assembly to keep the tip 34 in the right angle position. It is, of course, possible to use an operating rod passing longitudinally along the inside of tube 88, in conjunction with appropriate levers, etc., not shown, to move the tip 34 from longitudinal position to perpendicular position, and vice versa, at will, as is well known in the art. Appropriate indicia or index means may be placed on the probe to assist in its positioning.

The probe 86 is inserted through the wall 12 into the inlet air chamber 16 via probe support generally designated by the numeral 122. The assembly 122 comprises a pipe section 104 welded or otherwise attached to wall 12. One or more extensions 105 are held by clamp means 108 terminating with a probe adjustment assembly 110. A seal section 112 may be used to prevent dust-laden air leakage. The adjustment assembly includes frame 130 attached to extension 105. Plate 132 is notched to receive the probe and is vertically and horizontally movable using adjustment screws 134 and 136 respectively.

When the probe 86 is withdrawn from the support and seal assembly 122, the pipe section 105 can be removed at joint 108, and the pipe section 104 closed off with a suitable plug, plate, or valve, not shown, but well known in the art.

FIG. 7 illustrates the use of the probe tube 86' when used with the bladder 76 to close off a tube 22. A cavity 78' is provided inside the tip 78 where the deflated bladder can be placed after the needle has been passed through the wall of the bladder. In this cavity the bladder is protected until the arm or tip 78 is centered along the axis of the tube 22C. Then as pressurized air is passed through the needle 79 into the bladder, it inflates, moving out of the cavity 78' and extending up into and eventually sealing the tube 22C. When an appropriate pressure in the bladder has been reached, (which can be set at the compressor) the tube is properly sealed and the needle can be withdrawn leaving the inflated bladder in position. At some later time, a workman can go into the outlet air chamber to remove the bag 24C and replace it with a new one. At that time the bladder 76 is deflated and recovered to be reused again.

While I have described my invention with some particularly, it will be clear that from the principles which have been described, one skilled in the art will be able to devise many other embodiments. For example, there are many other ways in which the probe can be constructed, as well as other ways in which a seal can be made between the probe and the tubes 22. All of these

What is claimed:

1. In an apparatus for filtering dust from dust-laden inlet air, in which a plurality of dust collecting elements are used and in which each of said elements is connected to and sealed through a tube sheet, said tube sheet separating an inlet air chamber from an outlet air chamber, said inlet air passing from said inlet air chamber into said elements, through the porous walls of said elements, and into said outlet air chamber, the improvement comprising; means to test the condition of at least one of said elements, comprising:
   a. a closable entry in the wall of said inlet air chamber;
   b. probe means adapted to be inserted into and move through said entry into said inlet air chamber;
   c. means to seal said probe means selectively to said at least one of said elements;
   d. means for flowing test gas at a substantially constant selected rate through said probe into said element when said probe is sealed thereto; and
   e. means for indicating the pressure of the gas in said elements while said test gas is flowing.

2. The apparatus of claim 1 including a plurality of short cylindrical tubes sealed through said tube sheet, said elements being sealed to said tubes, inflatable collar means surrounding a tip portion of said probe means and adapted to be inserted into a selected tube and including means to supply pressurized gas to inflate said collar means inside said tube to seal said probe tip to said tube.

3. The apparatus of claim 2 in which said tip portion is swivelly connected to said probe, said tip including means biasing said tip to a position at right angles to said probe.

4. The apparatus of claim 1 including index means on said probe means to locate said probe relative to a desired element.

5. The apparatus of claim 1 including rack and pinion means to transverse said probe tube in said entry means.

6. The apparatus of claim 1 wherein said test gas is injected at a substantially constant pressure with means to indicate the flow rate of said gas as a function of the condition of said element.

7. In an apparatus for filtering dust from dust-laden inlet air, in which a plurality of dust collecting elements are used and in which each of said elements is connected by means of a short cylindrical tube inserted and sealed through a tube sheet, said tube sheet separating an inlet air chamber from an outlet air chamber, said inlet air passing from said inlet air chamber through said tubes into said elements, through the porous walls of said elements, and into said outlet air chamber, the improvement comprising; means to seal the passage of air to one of said elements, comprising:
   a. closable entry means in the wall of said inlet air chamber;
   b. probe means adapted to be inserted into and moved through said entry means into said inlet air chamber;
   c. inflatable bladder means removably held to the leading end of said probe means;
   d. needle means connected to said probe means and removably inserted through the wall of and into the interior of said bladder means;
   e. means for inserting said bladder means selectively into one of said tubes;
   f. means including said needle means for inflating said bladder means inside said tube; and
   g. means for withdrawing said needle means from the wall of said bladder means.

8. In a system for filtering dust from dust-laden inlet air, in which a plurality of dust collecting elements are used and in which each of said elements is connected by means of a short cylindrical tube inserted and sealed through a tube sheet, said tube sheet separating an inlet air chamber from an outlet air chamber, said inlet air passing from said inlet air chamber through said tubes into said elements, through the porous walls of said elements, and into said outlet air chamber, the improvement comprising; the method of testing the condition of said element, comprising the steps of:
   a. inserting and moving a tubular probe means within said inlet air chamber;
   b. sealing the leading end of said tubular probe means into a selected one of said tubes to close said tube to said dust-laden inlet air;
   c. flowing test gas at a selected, substantially constant, flow rate through said probe means, through said tube and into said element; and
   d. measuring the pressure of the gas flowing into said probe means as an indication of the condition of said element.

9. The system of claim 8 in which test gas if flowed at a substantially constant pressure and said flow rate is measured as an indication of the condition of said element.

10. In a system for filtering dust from dust-laden inlet air, in which a plurality of dust collecting elements are used and in which each of said elements is connected by means of a short cylindrical tube inserted and sealed through a tube sheet, and said tube sheet separating an inlet air chamber from an outlet air chamber, said inlet air passing from said inlet air chamber through said tubes into said elements, through the porous walls of said elements, and into said outlet air chamber, the improvement comprising; the method of closing off air flow to a selected element comprising:
   a. inserting and moving a tubular probe means in said inlet air chamber, said probe means carrying an uninflated inflatable bladder means;
   b. positioning said bladder means in a selected one of said tubes;
   c. inflating said bladder means inside said tube until said inflated bladder fits tightly into and closes off dust-laden air flow through said tube; and
   d. withdrawing said probe means while leaving said inflated bladder means in said tube.

11. In an apparatus for filtering particles from particle-laden inlet air, in which a plurality of particle collecting elements are used and in which each of said elements is connected to and sealed through a tube sheet, said tube sheet separating an inlet air chamber from an outlet air chamber, said inlet air passing from said inlet air chamber through the porous walls of said elements, and into said outlet air chamber, the improvement comprising; means to test the condition of at least one of said elements, comprising:
  a. a probe means;
  b. means to seal said probe means relative to a selected element;
  c. means for flowing test gas into said element while said probe is sealed thereto; and
  d. means to relate the pressure of the gas, while said test gas is flowing as a function of the particle collecting elements's condition.

12. The apparatus of claim 11 wherein said test gas is injected at a substantially constant pressure and means to relate the flow rate of said gas as a function of the particle collecting element's condition.

13. In an apparatus for filtering dust from dust-laden inlet air, in which a plurality of dust collecting elements are used and in which each of said elements is connected by means of a short cylindrical tube inserted and sealed through a tube sheet, said tube sheet separating an inlet air chamber from an outlet air chamber, said inlet air passing from said inlet air chamber through said tubes into said elements, through the porous walls of said elements, and into said outlet air chamber, the improvement comprising; means to seal the passage of air to one of said elements, comprising:
  a. probe means in said inlet air chamber;
  b. tube close-off means removably held to the leading end of said probe means;
  c. means for inserting said close-off means selectively into one of said tubes; and
  d. means for withdrawing said probe while leaving said close-off means in said tube.

14. In a system for filtering particles from particle-laden inlet air, in which a plurality of particle collecting elements are used and in which each of said elements is connected by means of a short cylindrical tube inserted and sealed through a tube sheet, said tube sheet separating an inlet air chamber from an outlet air chamber, said inlet air passing from said inlet air chamber through said tubes into said elements, through the porous walls of said elements, and into said outlet air chamber, the improvement comprising; the method of testing the condition of said element, comprising the steps of:
  a. moving a tubular probe means within said inlet air chamber;
  b. sealing the leading end of said tubular probe means into a selected one of said tubes to close said tube to said particle-laden inlet air;
  c. flowing test gas through said probe means, through said tube and into said element; and
  d. measuring the pressure or flow of the gas into said element as a function of the element's condition.

15. In a system for filtering dust from particle-laden inlet air, in which a plurality of particle collecting elements are used and in which each of said elements is connected by means of a short cylindrical tube inserted and sealed through a tube sheet, said tube sheet separating an inlet passing from said inlet air chamber through said tubes into said elements, through the porous walls of said elements, and into said outlet air chamber, the improvement comprising; the method of closing off air flow to a selected element comprising:
  a. moving a tubular probe means in said inlet air chamber, said probe means removably carrying a tube close-off means;
  b. positioning said close-off means in a selected one of said tubes to close-off particle-laden air flow through said tube; and
  c. withdrawing said probe means while leaving said close-off means in said tube.

* * * * *